United States Patent
Goli et al.

(10) Patent No.: US 10,981,570 B2
(45) Date of Patent: Apr. 20, 2021

(54) RIMPULL LIMIT BASED ON WHEEL SLIPPAGE

(71) Applicant: Caterpillar Inc., Deerfield, IL (US)

(72) Inventors: Suman Goli, Edwards, IL (US); Dhanashekar Arcot Krishnamurthy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 261 days.

(21) Appl. No.: 16/272,708

(22) Filed: Feb. 11, 2019

(65) Prior Publication Data

US 2020/0255018 A1    Aug. 13, 2020

(51) Int. Cl.
| | |
|---|---|
| *B60W 30/18* | (2012.01) |
| *B60W 20/40* | (2016.01) |
| *F16H 61/02* | (2006.01) |
| *F16H 37/02* | (2006.01) |
| *F16H 59/44* | (2006.01) |
| *F16H 59/40* | (2006.01) |

(Continued)

(52) U.S. Cl.
CPC ...... *B60W 30/18172* (2013.01); *B60W 20/40* (2013.01); *B60W 30/18009* (2013.01); *F16H 37/021* (2013.01); *F16H 59/40* (2013.01); *F16H 59/44* (2013.01); *F16H 61/0202* (2013.01); *F16H 61/472* (2013.01); *B60W 2300/152* (2013.01); *B60W 2300/17* (2013.01); *B60Y 2200/415* (2013.01); *B60Y 2300/18175* (2013.01); *F16H 2059/506* (2013.01); *F16H 2061/0012* (2013.01)

(58) Field of Classification Search
CPC ........... B60W 30/18172; B60W 20/40; B60W 30/18009; B60W 2300/152; B60W 2300/17; F16H 61/0202; F16H 37/021; F16H 59/44; F16H 59/40; F16H 2061/0012; F16H 2059/506; F16H 61/472; B60Y 2300/18175; B60Y 2200/415
See application file for complete search history.

(56) References Cited

U.S. PATENT DOCUMENTS

| | | | |
|---|---|---|---|
| 7,340,339 B1 * | 3/2008 | Fabry | B60K 28/16 |
| | | | 477/3 |
| 8,843,285 B2 * | 9/2014 | Gratton | F16H 61/66 |
| | | | 701/51 |

(Continued)

FOREIGN PATENT DOCUMENTS

| | | |
|---|---|---|
| EP | 2907368 B1 | 6/2017 |
| WO | 2010046905 A1 | 4/2010 |

*Primary Examiner* — Sze-Hon Kong
(74) *Attorney, Agent, or Firm* — Harrity & Harrity LLP

(57) ABSTRACT

A machine is disclosed. The machine may include a continuously variable transmission, a location or movement module, and a controller. The controller may receive a first signal indicating a transmission output speed for the machine. The controller may receive, from the location or movement module, a second signal indicating location or movement information of the machine. The controller may determine a traction value based on the first signal and the second signal. The controller may determine a rimpull limit value based on the traction value. The controller may provide the rimpull limit value to the continuously variable transmission, wherein the continuously variable transmission is to determine a transmission output torque of the machine based on the rimpull limit value.

20 Claims, 3 Drawing Sheets

(51) Int. Cl.
  *F16H 61/472*   (2010.01)
  *F16H 61/00*    (2006.01)
  *F16H 59/50*    (2006.01)

(56) References Cited

U.S. PATENT DOCUMENTS

| | | | |
|---|---|---|---|
| 9,050,978 B2 | 6/2015 | Deere | |
| 10,697,151 B2* | 6/2020 | Bozdech | E02F 9/2025 |
| 2008/0234901 A1* | 9/2008 | Johnson | E02F 9/2029 |
| | | | 701/50 |
| 2008/0234902 A1* | 9/2008 | Johnson | E02F 3/422 |
| | | | 701/50 |
| 2012/0293316 A1* | 11/2012 | Johnson | G09B 19/167 |
| | | | 340/438 |
| 2013/0253783 A1* | 9/2013 | Gratton | F16H 61/66 |
| | | | 701/51 |
| 2014/0249729 A1* | 9/2014 | Schwartz | B60T 7/122 |
| | | | 701/70 |
| 2015/0203117 A1* | 7/2015 | Kelly | B60K 31/02 |
| | | | 701/91 |
| 2015/0336584 A1* | 11/2015 | Bakken | F16H 61/475 |
| | | | 701/51 |
| 2016/0208458 A1* | 7/2016 | Juricak | E02F 9/2079 |
| 2017/0158187 A1* | 6/2017 | Calvert | B60K 6/12 |
| 2018/0015927 A1* | 1/2018 | Mitchell | B62D 5/065 |
| 2018/0179719 A1* | 6/2018 | Wisley | E02F 9/261 |
| 2018/0244278 A1* | 8/2018 | Shami | G05D 1/0088 |
| 2018/0373257 A1* | 12/2018 | Runde | A01B 69/008 |
| 2019/0024781 A1* | 1/2019 | Chrungoo | G08G 1/162 |
| 2020/0063399 A1* | 2/2020 | Miller | E02F 3/437 |
| 2020/0063401 A1* | 2/2020 | Sherlock | G05D 1/0246 |
| 2020/0173144 A1* | 6/2020 | Ito | F02D 29/00 |
| 2020/0223310 A1* | 7/2020 | Weidemann | B60K 23/0808 |

* cited by examiner

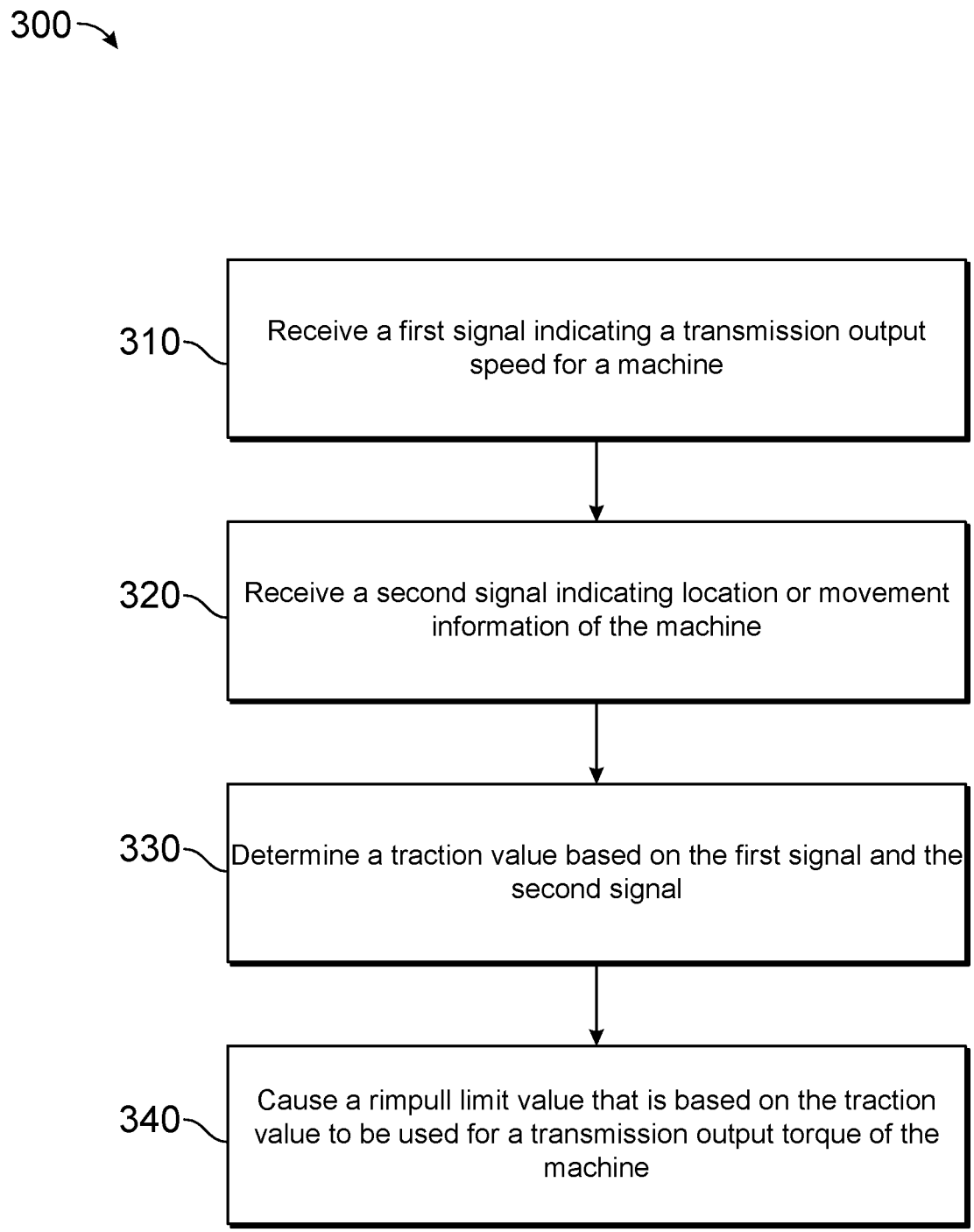

RIMPULL LIMIT BASED ON WHEEL SLIPPAGE

TECHNICAL FIELD

The present disclosure relates generally to a power system and, more particularly, to a rimpull limit based on wheel slippage.

BACKGROUND

Machines, such as wheel loaders, dozers, and other heavy equipment, are used to perform many tasks. To effectively perform these tasks, the machines require an engine that provides torque through a transmission to one or more ground engagements, such as treads, tires, and/or the like. A force at the ground engagement may be referred to as a rimpull. A machine may encounter significant wheel slip when engaging a pile, which may cause wear. A coefficient of traction may be used to determine a rimpull limit based on which to throttle torque so that wheel slip is controlled. For example, this coefficient of traction may be a default value or may be specified by an operator. However, a coefficient of traction may not be universally applicable in different situations and different underfoot conditions. Therefore, there is a need for a technique for adjusting coefficient of traction for different situations without relying on a default value or an operator-specified value.

One attempt to adjust a performance of a machine based on wheel slip is disclosed in European Patent No. 2907368 that issued to Hoberge et al. on Jun. 21, 2017 ("the '368 patent"). In particular, the '368 patent discloses "a traction control automatic control system for a tractor pulling a trailer, in particular a field sprayer." The traction control automatic control system may include "means for detecting the driving speed" such as "a radar system and/or an ultrasonic sensor and/or a GPS sensor." The traction control automatic control system may "determine whether a relevant deviation between the traveling speed of the field sprayer and the driving speed of the driven wheels of the tractor is determined on the basis of the obtained data." "A deviation may then be considered relevant if, for example, the difference between the wheel rotational speed of the driven wheels and the vehicle speed is greater than a predefined threshold value . . . If the threshold is exceeded, the control unit can assume a slip . . . The control unit can be designed to change a load on the tractor and/or a working depth of the trailer . . . as traction-enhancing measures."

While the traction control automatic control system of the '368 patent may disclose a system for controlling slip of a tractor using a working depth of a trailer, the '368 patent fails to disclose determination of a rimpull limit based on a wheel slip. Furthermore, the '368 patent fails to disclose modification of a transmission output torque of a machine based on the rimpull limit, rather than based on a working depth of a trailer.

The power system of the present disclosure solves one or more of the problems set forth above and/or other problems in the art.

SUMMARY

According to some implementations, the present disclosure is related to a method. The method may comprise receiving, by a controller, a first signal indicating a transmission output speed for a machine. The method may comprise receiving, by the controller, a second signal indicating location or movement information of the machine. The method may comprise determining, by the controller, a traction value based on the first signal and the second signal. The method may comprise causing, by the controller, a rimpull limit value that is based on the traction value to be used for a transmission output torque of the machine.

According to some implementations, the present disclosure is related to a machine that comprises a continuously variable transmission, a location or movement module, and a controller. The controller may receive a first signal indicating a transmission output speed for the machine. The controller may receive, from the location or movement module, a second signal indicating location or movement information of the machine. The controller may determine a traction value based on the first signal and the second signal. The controller may determine a rimpull limit value based on the traction value. The controller may provide the rimpull limit value to the continuously variable transmission, wherein the continuously variable transmission is to determine a transmission output torque of the machine based on the rimpull limit value.

According to some implementations, the present disclosure is related to a system that comprises a location or movement module and a controller. The controller may receive a first signal indicating a transmission output speed for a machine. The controller may receive, from the location or movement module, a second signal indicating location or movement information of the machine. The controller may determine a traction value based on the first signal and the second signal. The controller may determine a rimpull limit value based on the traction value. The controller may provide the rimpull limit value to a continuously variable transmission for determination of a transmission output torque of the machine based on the rimpull limit value.

BRIEF DESCRIPTION OF THE DRAWINGS

FIG. 3 is a flow chart of an example process for determining a rimpull limit based on wheel slippage.

DETAILED DESCRIPTION

Some implementations described herein relate to various machines, such as a wheel loader, a bus, an on- or off-highway haul truck, or any other type of machine.

Figure 1:
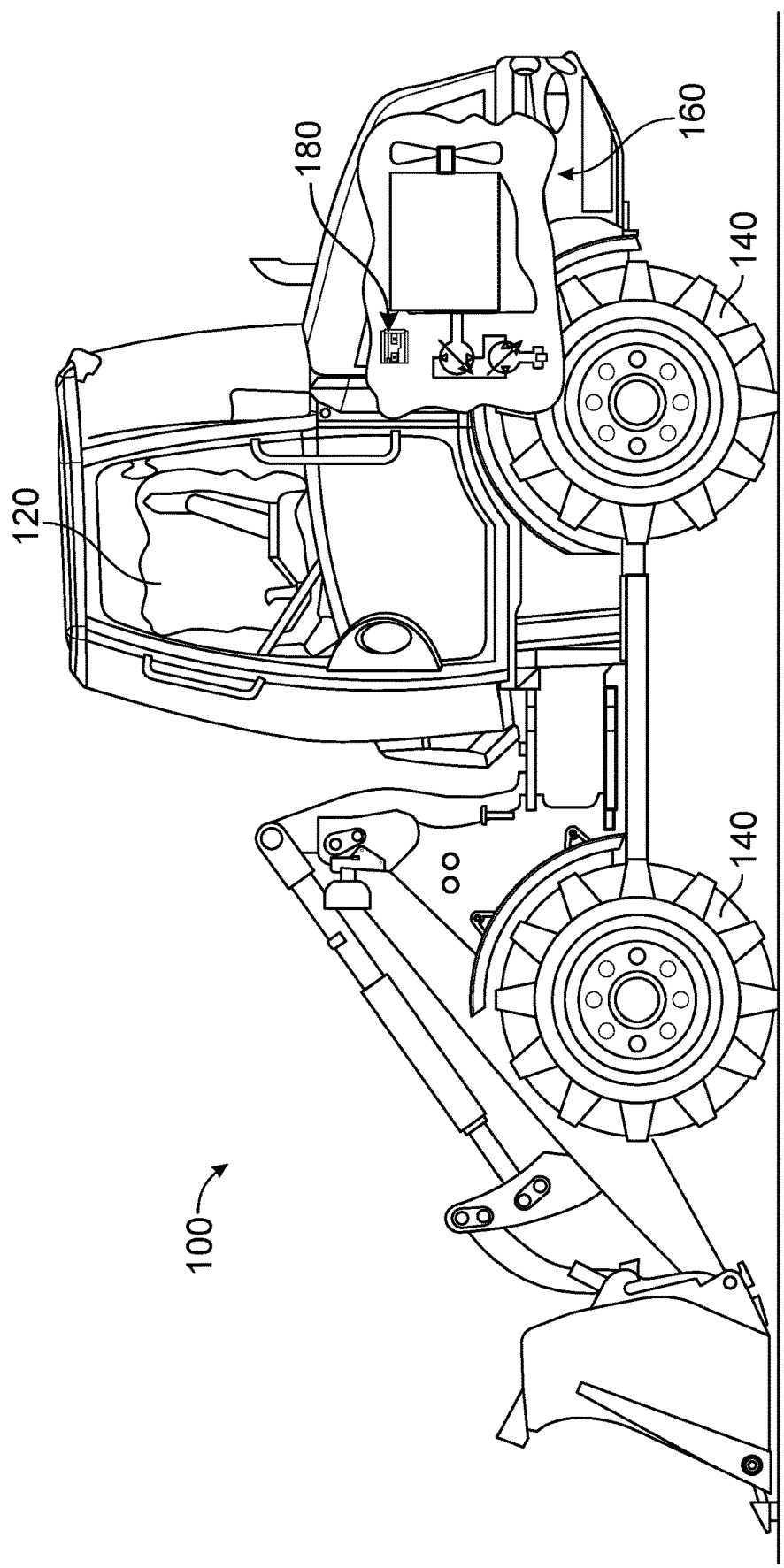
FIG. 1 is diagram of an example machine described herein.

FIG. 1 is a diagram of an example machine 100 described herein. For example, machine 100 may include a mobile machine such as the wheel loader shown in FIG. 1, a bus, an on- or off-highway haul truck, or any other type of mobile machine. Machine 100 may include an operator station 120, one or more ground engagements 140 (sometimes referred to as ground engagements, a powertrain 160 operatively connected to drive at least one of ground engagements 140, and a controller 180 connected to one or more other components of machine 100. The controller 180 may perform operations related to rimpull limit determination based on wheel slip, as described in more detail elsewhere herein.

As indicated above, FIG. 1 is provided as an example. Other examples may differ from what is described in connection with FIG. 1.

Figure 2:
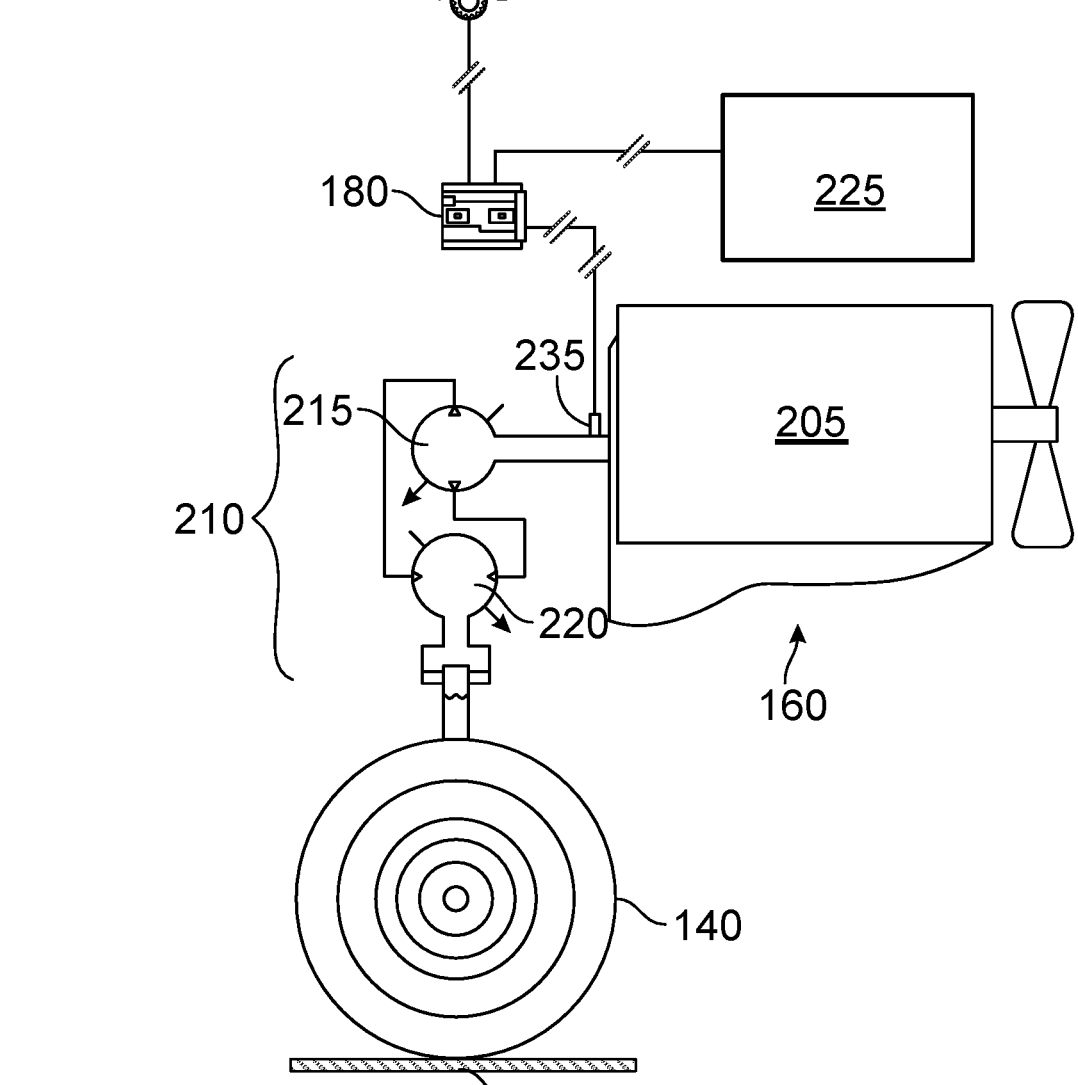
FIG. 2 is a diagram of an example transmission system for a machine described herein.

FIG. 2 is a diagram of an example transmission system 200 for a machine 100 described herein.

As shown in FIG. 2, powertrain 160 may be configured to generate and transmit power to ground engagements 140. In particular, powertrain 160 may include an engine 205 that generates a power output, a transmission 210 to receive the power output and transmit the power output to ground engagements 140, and a controller 180 configured to regulate the operation of engine 205 and transmission 210 based on one or more inputs (e.g., based on inputs from sensor 235, kinematic information, or an operator input).

Engine 205 may include an internal combustion engine that produces mechanical and/or electrical power output. For the purposes of this disclosure, engine 205 is shown and described as a four-stroke diesel engine. In some implementations, engine 205 may be any other type of internal combustion engine such as, for example, a gasoline or a gaseous fuel-powered engine. The subsystems of engine 205 may include, for example, a fuel system, an air induction system, an exhaust system, a lubrication system, a cooling system, and/or the like. Engine 205 may be configured to produce a torque output directed to transmission 210 and to other parasitic loads (e.g., to hydraulic systems, electrical systems, cooling systems, etc.) through a range of speeds.

Transmission 210 includes, for example, a continuously variable transmission (CVT), a hybrid transmission, and/or the like. Transmission 210 may be any type of continuously variable transmission, such as a hydraulic CVT, a hydromechanical CVT, an electric CVT, and/or the like.

Transmission 210 may include a driving element 215 and a driven element 220 that is powered by driving element 215. In the exemplary hydraulic CVT of FIG. 2, driving element 215 is a pump, such as a variable displacement hydraulic pump, and driven element 220 is a motor, such as a variable displacement hydraulic motor configured to receive pressurized fluid from driving element 215. Driving element 215 may be connected to drive driven element 220 with pressurized fluid via one or more conduits based on a torque command directed to driving and/or driven elements 215, 220 by controller 180. In some situations, driven element 220 may alternatively drive driving element 215 in reverse direction, for example during a braking event.

In some implementations, transmission 210 may be an electric CVT. In this configuration, driving element 215 may be a generator driven by engine 205, and driven element 220 may be a motor mechanically connected to ground engagement 140 and configured to receive electricity produced by the generator. The motor of the electric configuration may be powered by the generator based on a torque command from controller 180.

In some instances, the torque command directed to transmission 210 may change without a corresponding change in an operator input. For example, when traveling at steady state, machine 100 could encounter a hill and begin to speed up or slow down. In either of these situations, controller 180 may sense the change in speed and adjust the torque command directed to transmission 210 to maintain the desired speed. As a ratio of transmission 210 is adjusted based on the torque command from controller 180, transmission 210 may draw varying amounts of torque from engine 205.

In some implementations, controller 180 may determine a torque command based on an operator input. For example, an operator may provide an input identifying a coefficient of friction or coefficient of traction between ground engagement 140 and surface 245 using input device 230. Input device 230 may provide a signal identifying the coefficient of friction or the coefficient of traction to controller 180. Input device 230 may be provided in operator station 120. Input device 230 may comprise a knob, a switch, a lever, a keypad, and/or the like. In some implementations, controller 180 may determine a torque based on a rimpull limit. For example, a rimpull limit may identify a maximum allowable force at the interface between ground engagement 140 and surface 245. Controller 180 may determine the torque so that the rimpull limit is not violated. In some cases, controller 180 may provide information identifying the rimpull limit to transmission 210 and transmission 210 may identify the appropriate torque to be transmitted from engine 205 to ground engagement 140.

In some implementations, controller 180 may determine the torque based on kinematic information. For example, kinematic information may include a bucket lift angle, a bucket tilt angle, a horizontal or vertical force at a bucket tip, a lift cylinder force in a hydraulic cylinder associated with the bucket, a machine weight, a change in a lift cylinder force due to force at the bucket tip, a lift cylinder force induced by an empty bucket linkage weight, and/or the like. This kinematic information may affect the balance of forces at the ground engagement, so the kinematic information may be used, in conjunction with the coefficient of friction or the coefficient of traction and the rimpull limit, to determine the torque.

Location or movement module 225 comprises a Global Positioning System (GPS) unit, an inertial measurement unit, and/or the like. Location or movement module 225 may provide a signal indicating a velocity, a speed, an acceleration, an angular rate of rotation, an angular acceleration, and/or the like to controller 180.

Sensor 235 include one or more sensor devices that provide a signal indicating a transmission output speed to controller 180. The transmission output speed may identify a transmission out speed of the transmission 210 (e.g., a rotational speed of a shaft of machine 100), a rotational speed of an axle of machine 100, and/or the like. While sensor 235 is shown on a drive shaft or input shaft of the transmission 210, sensor 235 may be provided elsewhere on machine 100 (e.g., at a ground engagement, on an axle, and/or the like). Controller 180 may use a difference between the transmission output speed and information provided by location or movement module 225 to identify wheel slip. As an example, if the transmission output speed indicates that a wheel is rotating at a first rotational speed corresponding to a first speed of machine 100, and location or movement module 225 provides information indicating a second speed of machine 100 that is slower than the first speed, then controller 180 may identify wheel slip.

Controller 180 includes a central processing unit (CPU), a microprocessor, a microcontroller, a control unit, an engine control unit, a processor, or another type of processing component. In some implementations, controller 180 includes one or more processors capable of being programmed to perform a function. Controller 180 may include a memory, such as a random access memory (RAM), a read only memory (ROM), and/or another type of dynamic or static storage device (e.g., a flash memory, a magnetic memory, and/or an optical memory) that stores information and/or instructions for use by controller 180.

One or more of the parts of transmission system 200 may be referred to as a system 240. For example, system 240 may include one or more of controller 180, engine 205, transmission 210, location or movement module 225, input device 230, or sensor 235. The system 240 may perform one or more of the operations described herein.

As indicated above, FIG. 2 is provided as an example. Other examples may differ from what is described in connection with FIG. 2

FIG. 3 is a flow chart of an example process 300 for determining a rimpull limit based on wheel slippage. One or more process blocks of FIG. 3 may be performed by a controller (e.g., controller 180). Additionally, or alternatively, one or more process blocks of FIG. 3 may be performed by another device or a group of devices separate from or including controller 180, such as transmission 210, location or movement module 225, input device 230, sensor 235, and/or the like.

As shown in FIG. 3, process 300 may include receiving a first signal indicating a transmission output speed for a machine (block 310). For example, the controller may receive a first signal indicating a transmission output speed for a machine (e.g., machine 100). In some cases, the controller may receive the first signal from a sensor (e.g., sensor 235). In some cases, the controller may receive the first signal from another part of the machine (e.g., transmission 210, ground engagement 140, etc.).

As further shown in FIG. 3, process 300 may include receiving a second signal indicating location or movement information of the machine (block 320). For example, the controller may receive a second signal indicating location or movement information of the machine. The controller may receive the second signal from a location or movement module (e.g., location or movement module 225) of the machine.

As further shown in FIG. 3, process 300 may include determining a traction value based on the first signal and the second signal (block 330). For example, the controller may determine a traction value based on the first signal and the second signal. The traction value may be based on a coefficient of friction, a coefficient of traction, and/or the like. In some cases, the controller may determine the traction value based on (e.g., as a modification to) an operator input, such as an operator input indicating a traction value. In some cases, the controller may determine an initial traction value, or may determine an updated traction value based on a default traction value.

As further shown in FIG. 3, process 300 may include causing a rimpull limit value that is based on the traction value to be used for a transmission output torque of the machine (block 340). For example, the controller may cause a rimpull limit value to be used for a transmission output torque of the machine. The rimpull limit value may be based on the traction value. In some implementations, the controller may determine the rimpull limit value based on a third signal. For example, the controller may receive a third signal identifying kinematic information for the machine, wherein the rimpull limit value is based on the third signal. In some implementations, the kinematic information may identify at least one of a bucket lift angle, a bucket tilt angle, a force at a bucket tip, or a pressure in a hydraulic cylinder associated with a bucket.

Although FIG. 3 shows example blocks of process 300, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

Machines used in on-road and off-road locations may experience loss of traction. For example, a wheel loader may experience wheel slip at a ground engagement when engaging a pile. This wheel slip may be different in different conditions. For example, icy or sandy ground may cause more wheel slip than asphalt or hard-packed ground. Some machines may provide for determination of a rimpull limit (e.g., a maximum allowable rimpull at a ground engagement of the machine) based on a traction value (e.g., a coefficient of friction or a coefficient of traction). This traction value may account for the differences in friction due to conditions or a surface type of the ground on which the machine is operating.

Some traction values may be specified by an operator. However, an operator-specified traction value may or may not be accurate. For example, an inexperienced operator may not be aware that the traction value can even be specified, or may not provide an accurate traction value due to inexperience. As another example, an operator may not adjust a traction value when transitioning from one surface to another. Some traction values may use a default traction value. However, this may defeat the purpose of using a variable traction value, since the default traction value may not be consistent across different surfaces.

Implementations described herein provide determination or adjustment of a traction value, and therefore modification of a rimpull limit, when wheel slip is detected. For example, a controller 180 may detect wheel slip based on a signal identifying a transmission output speed (e.g., a shaft or axle rotational speed, wheel rotational speed, a value that is related to wheel rotational speed, etc.) and a signal identifying location or movement information. When the transmission output speed does not match the location or movement information (e.g., when a ground engagement 140 of the machine 100 is spinning more quickly than would correspond to a speed of the machine identified by the location or movement information), then the controller 180 may modify (e.g., reduce) a traction value of the machine 100. By reducing the traction value, the controller 180 may reduce a rimpull limit value that is used by the transmission 210 to determine a transmission output torque. The controller 180 may provide the reduced rimpull limit value to the transmission 210 for determination of a transmission output torque based on the reduced rimpull limit value or may provide an adjustment to an initial rimpull limit value of the transmission 210. Thus, the transmission 210 may reduce the transmission output torque, thereby reducing or eliminating the wheel slip. This, in turn, may reduce wear on the ground engagements and/or other parts of the machine.

The controller 180 may determine a difference between a first signal identifying the transmission output speed and a second signal identifying the location or movement information. For example, the controller 180 may determine a difference between an expected speed or velocity of the machine 100 (e.g., based on the transmission output speed, based on a wheel radius, and/or the like) and an observed speed or velocity of the machine 100 (e.g., based on the location or movement information). The controller 180 may determine a traction value, or a modification to a traction value, based on the difference. For example, the controller 180 may adjust the traction value proportionately to the difference (e.g., a larger adjustment for a larger difference, and vice versa). As another example, the controller 180 may determine a lower traction value (indicating a slicker ground surface) for a larger difference or may determine a higher traction value for a smaller difference. In this way, the controller 180 may dynamically adjust traction values (and therefore rimpull limit values or transmission output torques) based on wheel slip that is detected using a location or movement module 225 of the machine 100, thereby improving ground engagement life and efficiency of the machine 100.

What is claimed is:

1. A method, comprising:
   receiving, by a controller, a first signal indicating a transmission output speed for a machine;
   receiving, by the controller, a second signal indicating location or movement information of the machine;
   determining, by the controller, a traction value based on the first signal and the second signal; and
   causing, by the controller, a rimpull limit value that is based on the traction value to be used for a transmission output torque of the machine.

2. The method of claim 1, wherein the second signal is received from an inertial measurement unit or a global positioning system unit.

3. The method of claim 1, wherein the traction value is an updated traction value, and wherein the method further comprises:
   receiving information identifying an initial traction value, wherein the updated traction value is based on the initial traction value.

4. The method of claim 3, wherein the initial traction value is based on an operator input.

5. The method of claim 3, wherein the initial traction value is based on a default traction value.

6. The method of claim 1, wherein the traction value is based on a coefficient of friction or a coefficient of traction at a ground engagement of the machine.

7. The method of claim 1, further comprising:
   determining the rimpull limit value based on the traction value, the first signal, and the second signal.

8. The method of claim 1, wherein the causing the rimpull limit value to be used for the transmission output torque of the machine further comprises:
   providing the rimpull limit value to a continuously variable transmission of the machine for the continuously variable transmission to determine the transmission output torque based on the rimpull limit value.

9. The method of claim 1, wherein the determining the traction value based on the first signal and the second signal further comprises:
   determining the traction value based on detecting wheel slippage using the first signal and the second signal.

10. A machine, comprising:
    a continuously variable transmission;
    a location or movement module; and
    a controller to:
       receive a first signal indicating a transmission output speed for the machine;
       receive, from the location or movement module, a second signal indicating location or movement information of the machine;
       determine a traction value based on the first signal and the second signal;
       determine a rimpull limit value based on the traction value; and
       provide the rimpull limit value to the continuously variable transmission,
          wherein the continuously variable transmission is to determine a transmission output torque of the machine based on the rimpull limit value.

11. The machine of claim 10, wherein the traction value is an updated traction value, and wherein the controller, when determining the traction value, is to:
    determine the updated traction value based on an initial traction value.

12. The machine of claim 11, wherein the initial traction value is based on an operator input.

13. The machine of claim 10, wherein the controller is further to:
    receive a third signal identifying kinematic information for the machine, wherein the rimpull limit value is based on the third signal.

14. The machine of claim 13, wherein the kinematic information identifies at least one of:
    a bucket lift angle,
    a bucket tilt angle,
    a machine weight,
    a force at a bucket tip, or
    a force in a hydraulic cylinder associated with a bucket.

15. The machine of claim 10, wherein the location or movement information identifies at least one of:
    an acceleration of the machine,
    a velocity of the machine,
    an angular rate of rotation of the machine,
    an angular acceleration of the machine, or
    a speed of the machine.

16. The machine of claim 10, wherein the location or movement module comprises at least one of an inertial measurement unit or a global positioning system unit.

17. The machine of claim 10, wherein the continuously variable transmission is further to:
    provide the transmission output torque.

18. A system comprising:
    a location or movement module; and
    a controller to:
       receive a first signal indicating a transmission output speed for a machine;
       receive, from the location or movement module, a second signal indicating location or movement information of the machine;
       determine a traction value based on the first signal and the second signal;
       determine a rimpull limit value based on the traction value; and
       provide the rimpull limit value to a continuously variable transmission for determination of a transmission output torque of the machine based on the rimpull limit value.

19. The system of claim 18, wherein the rimpull limit value comprises an adjustment to an initial rimpull limit value.

20. The system of claim 18, wherein the controller, when determining the traction value based on the first signal and the second signal, is to:
    determine the traction value based on detecting wheel slippage using the first signal and the second signal.

* * * * *